Figure 1:
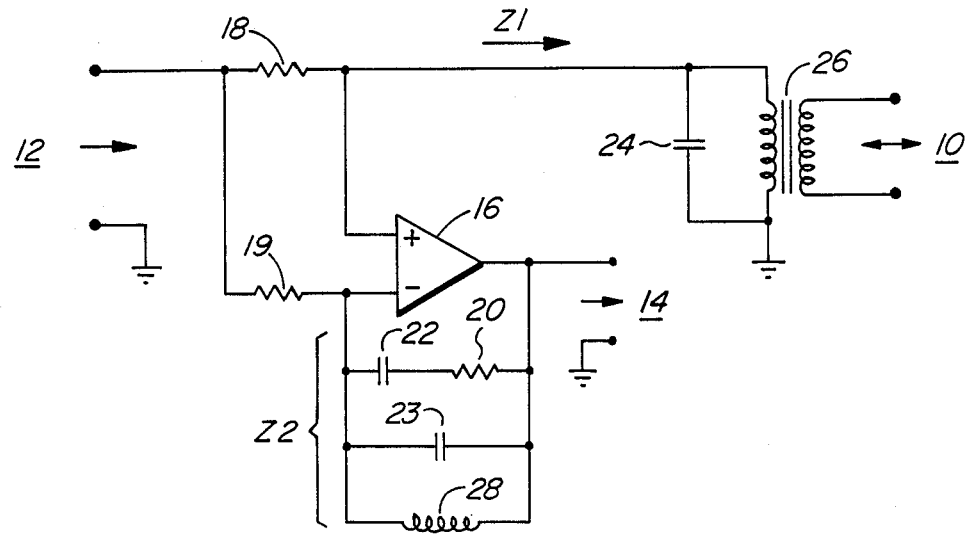

United States Patent [19]

Gawargy

[11] Patent Number: 4,878,244
[45] Date of Patent: Oct. 31, 1989

[54] ELECTRONIC HYBRID CIRCUIT

[75] Inventor: Mumtaz B. Gawargy, Nepean, Canada

[73] Assignee: Northern Telecom Limited, Montreal, Canada

[21] Appl. No.: 777,642

[22] Filed: Sep. 19, 1985

[51] Int. Cl.⁴ .............................................. H03B 1/58
[52] U.S. Cl. ...................................... 379/402; 379/378
[58] Field of Search ................... 179/16 F, 18 FA, 70, 179/77, 170 R, 170 G, 170 NC; 333/216, 217; 379/399, 400, 401, 402, 403, 404, 405, 406, 407, 345, 398, 395, 346, 408, 409, 342

[56] References Cited

U.S. PATENT DOCUMENTS

| | | | |
|---|---|---|---|
| 3,573,647 | 4/1971 | Antoniou | 330/69 |
| 3,970,805 | 7/1976 | Thomas | 179/170 NC |
| 4,284,859 | 8/1981 | Araseki | 379/405 |
| 4,346,266 | 8/1982 | Brockman et al. | 179/170 NC |
| 4,380,690 | 4/1983 | Matsufuji et al. | 179/170 NC |
| 4,500,755 | 2/1985 | Murto | 179/170 NC |
| 4,532,384 | 7/1985 | Keriakos et al. | 179/170 G |

OTHER PUBLICATIONS

"Novel Active Hybrid Circuit and its Applications", S. B. Park, *Electronics Letters*, vol. 11, No. 16, pp. 362-363, Aug. 7, 1975.

Primary Examiner—Jin F. Ng
Assistant Examiner—Randall Vaas
Attorney, Agent, or Firm—R. John Haley

[57] ABSTRACT

An electronic hybrid circuit includes a differential amplifier having its non-inverting input coupled via a resistor to a four-wire input port and via a coupling transformer to a two-wire input/output port, its output coupled to a four-wire output port, and its inverting input coupled via a resistor to the input port and also coupled to an impedance network. The impedance network includes an inductive impedance which is coupled either to the amplifier output or to circuit ground, and which may be constituted by a gyrator or other electronic circuit which simulates an inductor.

15 Claims, 1 Drawing Sheet

ELECTRONIC HYBRID CIRCUIT

This invention relates to electronic hybrid circuits for coupling signals between a two-wire input/output port and four-wire input and output ports.

It is well known to provide a hybrid circuit for coupling signals between two-wire and four-wire paths. For example, such a hybrid circuit is commonly used in voice frequency repeaters in the transmission of telephony signals, the signals being transmitted on bidirectional two-wire lines but being handled unidirectionally within each repeater. Furthermore, it is well known to make the hybrid circuit an active or electronic hybrid circuit, and numerous examples of electronic hybrid circuits exist in the prior art.

Increasing demands are being placed on the characteristics of electronic hybrid circuits, in particular relating to the so-called return loss and insertion loss of the circuit. The return loss is a logarithmic expression for the amount of a signal applied to the four-wire input port which appears at the four-wire output port; a high return loss is desired. The insertion loss is a logarithmic expression for the amount of a signal applied to the two-wire port which appears at the four-wire output port, and is desired to be small and substantially constant for all signal frequencies to be handled. These desired characteristics, and also a short impulse response settling time, must be met for widely varying terminations of the two-wire input/output port, corresponding to wide variations in the characteristics of two-wire transmission lines which may be coupled thereto, and allowing for reasonable component tolerances so that the hybrid circuit can be conveniently manufactured.

An object of this invention, therefore, is to provide an improved electronic hybrid circuit.

According to this invention there is provided an electronic hybrid circuit comprising: an input port and an output port for connection to a four-wire path; a differential amplifier having an inverting input, a non-inverting input, and an output coupled to the output port; first and second impedances each coupled between the input port and a respective one of the inputs of the differential amplifier; means for coupling a two-wire path to a junction between the first impedance and the respective input of the differential amplifier; and impedance means coupled to a junction between the second impedance and the respective input of the differential amplifier, the impedance means including an inductive impedance.

The provision of the inductive impedance included in the impedance means considerably enhances the performance of the hybrid circuit in meeting stringent specifications.

In one embodiment of the invention the impedance means is coupled between the inverting input and the output of the differential amplifier. In another embodiment the inductive impedance of the impedance means is coupled between the inverting input of the differential amplifier and a point of reference potential, such as circuit ground. In either embodiment the inductive impedance may comprise an electronic circuit which simulates an inductor; this is particularly facilitated in the latter embodiment.

The impedance means preferably comprises a series-connected capacitor and resistor, and may also comprise a capacitor, in parallel with the inductive impedance or coupled between the inverting input and the output of the differential amplifier.

The first and second impedances preferably comprise resistors. Conveniently the means for coupling a two-wire path to the junction between the first impedance and the respective input of the differential amplifier comprises a coupling transformer.

Figure 2:
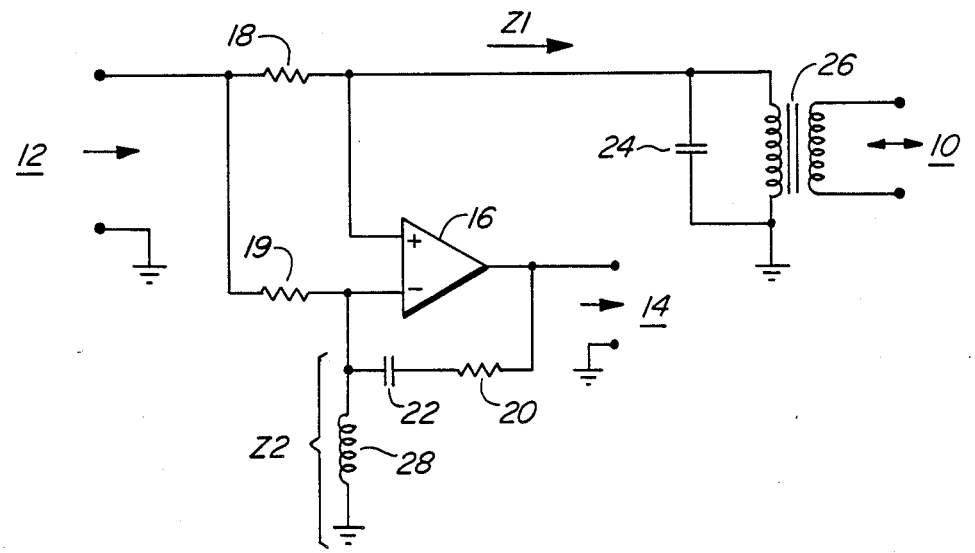

The invention will be further understood from the following description with reference to the accompanying drawings, in which FIGS. 1 and 2 schematically illustrate hybrid circuit arrangements in accordance with alternative embodiments of the invention. The same references are used in FIGS. 1 and 2 to denote similar elements.

The hybrid circuit arrangement illustrated in FIG. 1 provides for coupling of signals in a voice frequency band from 200Hz to 4kHz between a two-wire input/output port 10 and a four-wire input port 12 and output port 14. The hybrid circuit arrangement forms part of a voice frequency repeater of known form, the ports 12 and 14 being connected in operation to other parts of the repeater such as a signal coder/decoder (not shown) and the port 10 being coupled to a two-wire bidirectional transmission line.

The hybrid circuit comprises a differential amplifier 16, resistors 18 to 20, capacitors 22 to 24, a coupling transformer 26, and an inductor 28. A non-grounded terminal of the input port 12 is connected via the resistor 19 to the inverting (-) input, and via the resistor 18 to the non-inverting (+) input, of the differential amplifier 16, whose output is connected to a non-grounded terminal of the output port 14. The non-inverting input of the amplifier 16 is coupled to the input/output port 10, and hence to the two-wire line, via the coupling transformer 26, the capacitor 24 being connected in parallel with the winding of the transformer on the non-line side thereof. In addition the inductor 28, the capacitor 23, and the resistor 20 and the capacitor 22 connected in series, are connected in parallel with one another in a feedback circuit between the output and the inverting input of the amplifier 16.

A signal incoming from the two-wire line and present at the input/output port 10 is coupled via the transformer 26 to the non-inverting input of the amplifier 16, by which it is supplied to the output port 14. The resistance of the resistor 18 is matched to the nominal resistive impedance of the two-wire line as seen via the transformer 26, and the output impedance of the circuitry driving the input port 12 is much less than this, so that this signal has negligible effect at the input port 12. The insertion loss in decibels of the hybrid circuit is 20log(V14/V10), where V10 is the incoming signal voltage at the input/output port 10 and V14 is the resultant signal voltage at the output port 14.

Conversely, a signal incoming at the four-wire input port 12 is coupled via the resistor 18 and the transformer 26 to the input/output port 10. As it is desired that this signal not appear at the four-wire output port 14, it is also applied via the resistor 19 to the inverting input of the amplifier 16 for cancellation purposes. The return loss in decibels of the hybrid circuit is 20log(V14/V12), where V12 is the incoming signal voltage at the input port 12 and V14 is the resultant signal voltage at the output port 14.

The hybrid circuit of FIG. 1 is designed to meet the following stringent specifications, for a small and substantially constant insertion loss and a large return loss, in its intended voice frequency band:

| Insertion Loss | Return Loss |
| --- | --- |
| 0 to 4 dB at 200 Hz | >13 dB at 200 to 400 Hz |
| 0 to 2 dB at 300 Hz | >8 dB at 400 Hz to 4 kHz |
| 0 to 0.5 dB at 400 Hz | |
| 0 to 0.2 dB at 500 Hz to 4 kHz | |

These specifications must be met for a wide variety of terminations of the input/output port 10, as the characteristics of the two-wire line which is connected thereto may vary widely from its nominal impedance, which is considered to be equivalent to a 400 ohm resistor in series with a 2.1 microfarad capacitor. For example, extreme cases to be accommodated correspond to equivalent resistances of 135 ohms to 10 kilohms with the equivalent capacitor shorted.

The hybrid circuit of FIG. 1 meets these specifications by conforming substantially to an equation $(Z1Z18)=(Z2/Z19)$, where Z18 is the impedance of the resistor 18, Z19 is the impedance of the resistor 19, Z1 is the impedance seen at the junction between the resistor 18 and the non-inverting input of the amplifier 16 looking towards the input/output port 10, and Z2 is the impedance to ground seen at the junction between the resistor 19 and the inverting input of the amplifier 16 and provided substantially completely (because the output impedance of the amplifier 16 is relatively negligible) by the components 20, 22, 23, and 28 constituting the amplifier feedback circuit.

The impedances Z18 and Z19 are, for convenience and simplicity, made purely resistive. The resistance of the resistor 18 is, as already explained, matched to the nominal impedance of the two-wire line coupled to the input/output port 10 and is therefore selected to be 400 ohms. The resistance of the resistor 19 is selected to be 8.25 kilohms.

In consequence of the selection of these impedances Z18 and Z19 as being purely resistive, it follows that there can be a one-to-one relationship between the impedances which constitute the impedance Z2 and the equivalent impedance of the impedance Z1. As already explained, the two-wire line coupled to the input/output port 10 is equivalent to a resistor and a capacitor coupled in series. The capacitor 24 and the transformer 26 represent shunt capacitive and inductive reactances, respectively, of the impedance Z1. These component impedances of the impedance Z1 are balanced in a one-to-one relationship by the component impedances 22 and 20, 23, and 28 respectively of the impedance Z2, in compliance with the equation given above.

For example, in an embodiment of the invention in accordance with FIG. 1 and meeting the specifications given above, in which the capacitor 24 had a capacitance of 4.7 nF and the transformer 26 had a 1:1 ratio between its primary and secondary windings, the components of the impedance Z2 had the following magnitudes:

Resistor 20: 6.81 kilohms
Capacitor 22: 100 nF
Capacitor 23: 162 pF
Inductor 28: 3.78 H These values were arrived at by applying the equation given above to produce an initial set of values, and then optimizing these initial values for the desired specifications to produce these final values.

It will be noted that the capacitor 23 has a relatively small capacitance. It has been found in practice that this capacitance is not particularly critical, and that this capacitor may be omitted without unduly adversely affecting the performance of the hybrid circuit.

It will also be noted that the inductor 28 has a substantial inductance of several Henries. It is the provision of this inductance in particular which enhances the performance of the hybrid circuit, enabling the above specifications to be met, even for widely varying terminations of the input/output port 10 and without demanding very close tolerances for other components in the circuit. It should also be noted that the provision of such a large inductance differs substantially from known hybrid and other circuits, which generally attempt to avoid the use of inductors or at least reduce their inductances to low values so that any inductors which are provided are physically small.

As the output impedance of the amplifier 16 is negligible in comparison to the impedance Z2, it follows that one or more of the components 20 and 22 in series, 23 if provided, and 28 of this impedance can be connected between the inverting input of the amplifier 16 and circuit ground, or some other point of reference potential, rather than between the inverting input and the output of the amplifier 16. FIG. 2 illustrates such an alternative arrangement, in which the capacitor 23 is dispensed with, and the inductor 28 is connected to circuit ground rather than to the amplifier output. The remainder of the hybrid circuit of FIG. 2, and its operation, is the same as that of FIG. 1. The series-connected capacitor 22 and resistor 20 may also conceivably be connected to circuit ground rather than to the amplifier output.

In the hybrid circuit of either FIG. 1 or FIG. 2, the inductor 28 may be simulated by an electronic circuit in known manner. This is particularly convenient in the case of the hybrid circuit of FIG. 2, because in this circuit one terminal of the inductor 28 is grounded, whereas in the circuit of FIG. 1 both terminals of the inductor 28 float with respect to ground. One known form of electronic circuit which may be used to simulate the inductor 28 is generally known as an Antoniou gyrator and comprises two differential amplifiers and a plurality of resistors and capacitors forming an electrical impedance network. Such a circuit is described for example in Antoniou U.S. Pat. No. 3,573,647 issued April 6, 1971 and entitled "Electrical Impedance Converting Networks". Other forms of electronic circuit, including circuits with a single differential amplifier, may, however, be used to simulate the inductor 28.

Numerous other modifications, variations, and adaptations may be made to the particular embodiments of the invention described above without departing from the scope of the invention as defined in the claims.

What is claimed is:

1. An electronic hybrid circuit comprising:
   an input port and an output port for connection to a four-wire path;
   a differential amplifier having an inverting input, a non-inverting input, and an output coupled to the output port;
   first and second impedances each coupled between the input port and a respective one of the inputs of the differential amplifier;
   means for coupling a two-wire path to a junction between the first impedance and the differential amplifier; and
   impedance means coupled to a junction between the second impedance and the differential amplifier, the impedance means including an inductive impedance.

2. A circuit as claimed in claim 1 wherein the impedance means is coupled between the inverting input and the output of the differential amplifier.

3. A circuit as claimed in claim 1 wherein the inductive impedance of the impedance means is coupled between the inverting input of the differential amplifier and a ground point.

4. A circuit as claimed in claim 2 wherein the impedance means comprises a series-connected capacitor and resistor in parallel with the inductive impedance.

5. A circuit as claimed in claim 4 wherein the impedance means further comprises a capacitor in parallel with the inductive impedance.

6. A circuit as claimed in claim 4 wherein the inductive impedance comprises an electronic circuit which simulates an inductor.

7. A circuit as claimed in claim 6 wherein the first and second impedances comprise resistors.

8. A circuit as claimed in claim 7 wherein the means for coupling a two-wire path to the junction between the first impedance and the differential amplifier comprises a coupling transformer.

9. A circuit as claimed in claim 8 and including a capacitor coupled between the junction between the first impedance and the differential amplifier and a ground point.

10. A circuit as claimed in claim 3 wherein the impedance means comprises a series-connected capacitor and resistor coupled between the inverting input and the output of the differential amplifier.

11. A circuit as claimed in claim 10 wherein the impedance means further comprises a capacitor in parallel with the inductive impedance.

12. A circuit as claimed in claim 10 wherein the inductive impedance comprises an electronic circuit which simulates an inductor.

13. A circuit as claimed in claim 12 wherein the first and second impedances comprise resistors.

14. A circuit as claimed in claim 13 wherein the means for coupling a two-wire path to the junction between the first impedance and the differential amplifier comprises a coupling transformer.

15. A circuit as claimed in claim 14 and including a capacitor coupled between the junction between the first impedance and the differential amplifier and a ground point.

* * * * *